Figure 1:
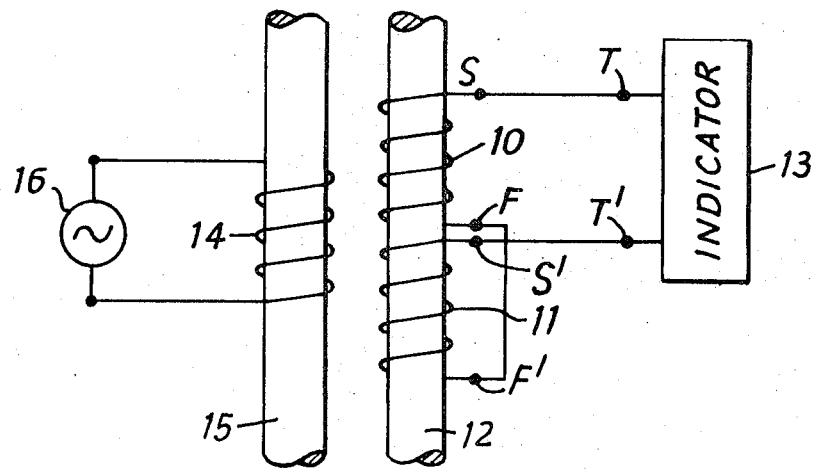

United States Patent [19]

McCalvey

[11] 3,827,291

[45] Aug. 6, 1974

[54] TRANSDUCER SYSTEMS FOR DETECTION OF RELATIVE DISPLACEMENT

[75] Inventor: Leo Francis McCalvey, Newcastle upon Tyne, England

[73] Assignee: International Research & Development Company Limited, Newcastle upon Tyne, England

[22] Filed: Nov. 29, 1971

[21] Appl. No.: 202,991

[30] Foreign Application Priority Data
Dec. 1, 1970 Great Britain.................... 57113/70
Dec. 31, 1970 Great Britain.................... 62035/70
June 23, 1971 Great Britain.................... 29508/71

[52] U.S. Cl................. 73/88.5 R, 336/30, 336/115
[51] Int. Cl. ............................................ G01b 7/24
[58] Field of Search.......... 73/88.5 R; 336/115, 119, 336/129, 30; 323/84, 90

[56] References Cited
UNITED STATES PATENTS
2,276,816  3/1942  Bagno .............................. 73/88.5 R
2,422,806  6/1947  Silverman et al. ................ 73/88.5 R
2,452,862  11/1948  Neff..................................... 336/119
2,836,803  5/1958  White et al. ........................ 336/119
2,905,914  9/1959  Proskauer.......................... 336/30 X
3,202,948  8/1965  Farrand .............................. 336/115

Primary Examiner—Charles A. Ruehl
Attorney, Agent, or Firm—Kemon, Palmer & Estabrook

[57] ABSTRACT

A transducer system wherein relative displacement of two members is detected by the change in inductive coupling between a single coil on one member and a pair of opposed coils on the other member, an A.C. input being applied to the coil or coils on one of the members and the output from the coils or coil on the other member being detected when the single coil is displaced from its normal symmetrical position relative to the two coils. The displacement to be measured may result from mechanical movement or vibration or from load, pressure or acceleration applied to devices incorporating the transducer system.

3 Claims, 7 Drawing Figures

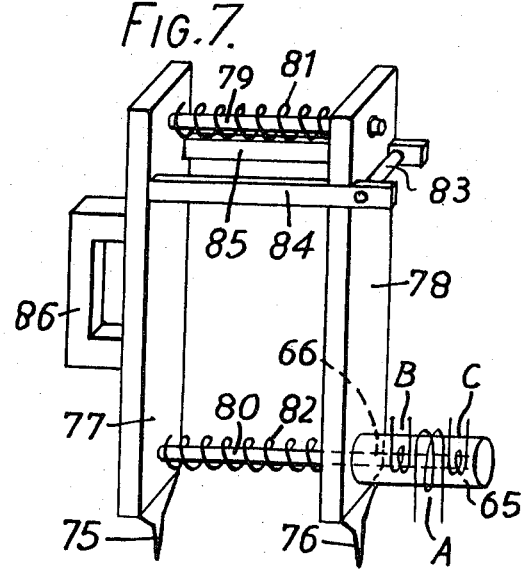

TRANSDUCER SYSTEMS FOR DETECTION OF RELATIVE DISPLACEMENT

The present invention relates to a transducer system for detection and/or measurement of relative displacement of two members. The transducer system operates inductively to generate an electrical output representing the mechanical displacement which has occurred. Such transducer systems are of very wide application since they can be used not only for detecting and measuring mechanical movement and vibration as such, but also for detection and measurement of physical variables which are easily converted into a mechanical movement. For example, the transducer system can be incorporated in a strain gauge to measure small changes in length of a specimen under stress. It can also be used for measuring pressures which are applied to a diaphragm to produce a displacement and likewise for measuring loads and accelerations which are converted into mechanical displacements. One particular application of the invention is to the measurement of displacements between two members one of which is within a high pressure, high temperature environment, such as may be present in a nuclear reactor structure.

In accordance with the invention a transducer system for detection and/or measurement of relative displacement of two members comprises a pair of electrical coils on one member and a single coil on the other member, the pair of coils being connected in series and arranged to interact inductively with the single coil in opposition to one another whereby when the single coil is in a symmetrical position with respect to the coils of the pair, the interactions are balanced against one another, means for supplying an alternating current to the single coil or the pair of series-connected coils and means for detecting the currents induced in the pair of coils or the single coil, respectively.

The coils may either be wound about axes parallel to the direction of relative displacement with the coils of the pair spaced along a common axis and the single coil wound about the same axis or a parallel axis or may have their axes perpendicular to the direction of displacement, the coils in the latter case preferably being flat coils with the coils of the pair lying in the same plane and spaced apart in the direction of displacement and the single coil lying in a parallel plane.

Figure 2:
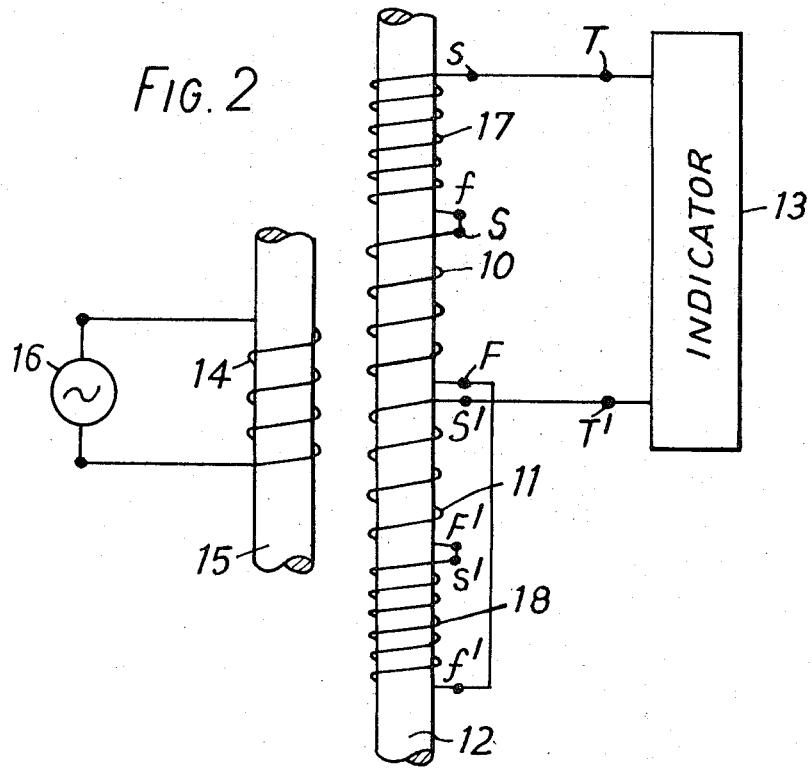
Figure 3:
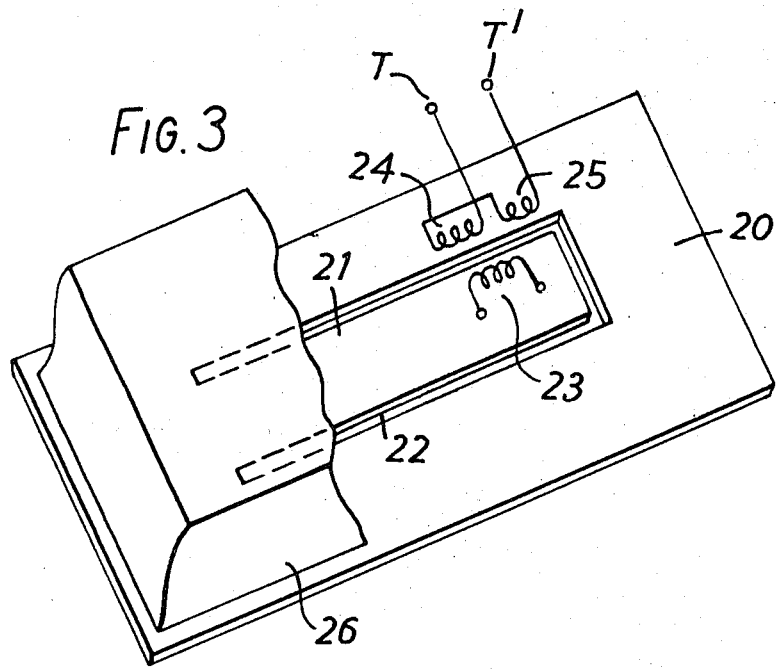
Figure 5:
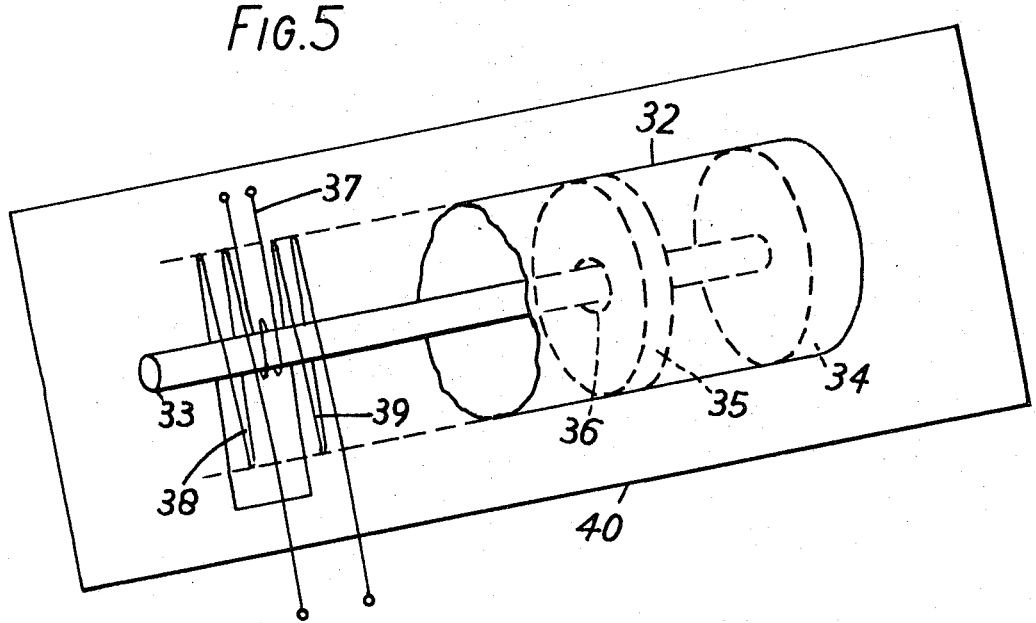
Figure 4:
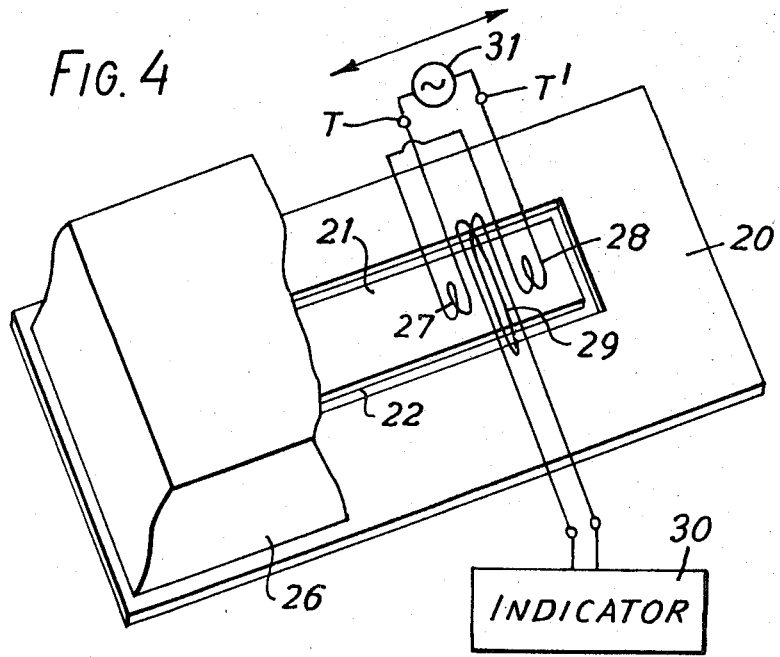
Figure 6:
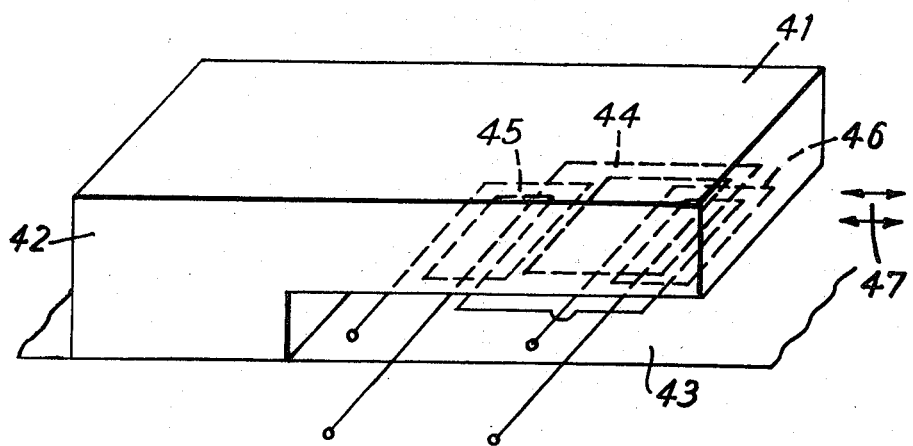

The invention will now be described in more detail with the aid of examples illustrated in the accompanying drawings, in which:

FIG. 1 shows in diagrammatic form a transducer system in accordance with the invention for measuring relative displacement between two members, FIG. 2 shows a modification of the transducer system of FIG. 1, FIG. 3 shows schematically a strain gauge incorporating a transducer system in accordance with the invention, FIG. 4 shows a modification of the strain gauge of FIG. 3, FIG. 5 shows a second form of strain gauge in accordance with the invention, FIG. 6 shows a third form of strain gauge in accordance with the invention, and FIG. 7 shows a length gauge incorporating the invention.

In the transducer system shown in FIG. 1 two coils 10 and 11 are helically wound around a first elongate former 12. The two coils are wound in the same sense around a common axis and are spaced along that axis. The finish end F of the coil 10 is connected to the finish end F' of the coil 11 and the start ends S and S' of the coils 10 and 11, respectively, are led out separately to terminals T and T', respectively, of an indicating instrument 13, such as a galvanometer. A third coil 14 is helically wound about a second elongate former 15 which is parallel to the former 12. The coil 14 is thus wound about an axis parallel to the axis of the coils 10 and 11. In this embodiment, the coil 14 has the same number of turns as the coils 10 and 11 and is of substantially equal axial length.

The coil 14 is connected across an alternating current source 16 and as a result of the current flowing in the coil 14 alternating voltages are developed across the coils 10 and 11 by the inductive interaction of the coil 14 with the coils 10 and 11. The arrangement and connection of the coils 10 and 11 is such that the voltages developed across them oppose each other and, when the coil 14 is midway between the coils 10 and 11, the voltages are equal and the net output to the indicating instrument 13 is zero. In the embodiment shown, this is achieved by making the coils 10 and 11 identical and connecting them in series opposition by connecting the finish end of one to the finish end of the other. It will be apparent that the two coils could be wound in opposition and connected directly in series to produce the same effect. The coil 14 can be an exactly similar coil but may have different numbers of turns, a different length and/or a different direction of winding.

Upon movement of the coil 14 in an axial direction relative to the coils 10 and 11, which may result from displacement or vibration of either of the formers 12 or 15 relative to the other, the signal induced in one of the coils 10 and 11 increases and that induced in the other coil diminishes. Hence an output signal is fed to the terminals T and T' of the indicating instrument B which increases rapidly in proportion to the displacement. This is registered by the instrument 13 and indicates the extent of the displacement.

To allow relative displacement of the coils it is, of course, necessary to provide either the single coil 14 on one former or the two coils 10 and 11 on the other former, or both, with flexible electrical leads.

FIG. 2 shows a modification which provides an increased range of relative displacement with a signal which increases more rapidly at the ends of the range. Further coils 17 and 18 are wound on the former 12. These coils 17 and 18 are wound in the same sense as the coils 10 and 11 but each has a greater number of turns, the number of turns being the same for coil 17 as for coil 18. The coil 17 is connected directly in series with the coil 10 by connecting the finish end $f$ of coil 17 to the start end S of coil 10. Similarly, the coil 18 is directly in series with the coil 11, having its start end $s'$ connected to the finish end F' of the coil 11. The finish end F of the coil 10 is connected to the finish end $f'$ of the coil 18 whereby the series combination of coils 10 and 17 is connected in series opposition to the series combination of coils 11 and 18 and the indicating instrument 13 is connected between the start end s of the coil 17 and to the start end S' of the coil 11.

The transducer systems described do not require any contact between the relatively-displaceable members on which the coils are mounted and hence are suitable for measuring relative displacements between a moving body and a fixed structure in a nuclear reactor or other high temperature and/or high pressure environments. For example, the single coil 14 may be embedded in a structure moving within a high temperature enclosure while the coils 10 and 11 are located on a fixed member inside or outside the high temperature enclosure. The coils can be insulated with a high temperature ceramic or similar insulation material which remains flexible while the windings are formed but becomes rigid on exposure to high temperature. Displacements of the order of $1 \times 10^{-4}$ inch in an environment at a temperature of 800° C. have been accurately measured with a transducer system in accordance with the invention.

Referring now to FIG. 3, the strain gauge shown comprises a flat metal plate or foil 20, which forms a base strain member, and a central tongue 21 which is attached to the base member 20 at one end but is otherwise unrestrained. The tongue 21 and base member 20 are formed from a single sheet of foil by cutting a slot 22 in the foil to define the tongue. A single coil 23 is mounted on the tongue 21 and a pair of coils 24 and 25 are mounted on the base member 20 adjacent the edge of the tongue, the coil 23 being parallel to the coils 24 and 25 and located midway between them in an axial direction. As shown, the coils 24 and 25 are connected in series opposition between terminals T and T' to which an indicating instrument is attached in the manner shown in FIG. 1; while the coil 23 is connected across an A.C. source in the manner shown in FIG. 1.

The base member 20 is rigidly fixed to the specimen under test, for example by the use of stitch welding around the edges of the foil. When the specimen is under stress the base member 20 undergoes longitudinal extension which results in displacement of the pair of coils 24 and 25. The tongue 21 which forms the reference member is only fixed at one end and thus is unaffected by the strain in the specimen. The output signal from the coils 24 and 25 indicates the displacement in the same manner as in the embodiments of FIGS. 1 and 2 and thereby measures the strain.

Since the base member and the reference member are made of the same material, which is preferably the material of the specimen under test, the gauge is unaffected by the differential thermal expansion of the specimen and the reference member. It is sufficient for this purpose if the reference member is made of the same material as the specimen since the base member, if made of suitable material, will follow the thermal expansion of the specimen. A sealed waterproof housing 26 allows the gauge to be immersed for long periods in corrosive fluids or environments without affecting the operation or the accuracy. Electrical leads to and from the coils can be made of mineral-insulated cable.

The strain gauge shown in FIG. 4 is similar to that in FIG. 3 and like parts have been given the same reference numerals. The difference lies in the arrangement of the transducer coils, which in the embodiment of FIG. 4 comprise a pair of coils 27 and 28 attached to the tongue 21 and a single coil 29 attached to the base member 20. The three coils are coaxial with the coil 29 encircling the coils 27 and 28 but this arrangement could be reversed, with the coil 29 inside the coils 27 and 28. As before, the two coils 27 and 28 are connected in series opposition. This embodiment illustrates the possibility, common to all embodiments of the invention, of interchanging the connections so that the single coil 29 is connected to an indicator 30 while the two coils 27 and 28 are supplied with current from an A.C. source 31. The strain gauge is mounted in exactly the same manner as that of FIG. 3 and operates in a similar way, the signals induced in the coil 29 by the coils 27 and 28 being in balance when the coils are in a symmetrical position with the coil 29 half-way between coils 27 and 28, but becoming more and more out of balance as the relative displacement of the coils increases.

The strain gauge shown in FIG. 5 consists of a base strain member 32 in the form of a tube which surrounds a reference member 33 in the form of a rod. The reference member 33 is mounted centrally within the tubular base member 32 by means of a spacer 34 rigidly fixed in one end of the member 32. The members 32, 33 and 34 are all of the same metal. An insulating spacer 35 having a central oversize clearance hole 36 supports the reference member 33. A single coil 37 is wound around and is insulated from the reference member 33 and a pair of coils 38 and 39 are fitted within the tubular base member 32 so that they surround the coil 37 coaxially. The electrical connections of the coils to an A.C. source and to a detecting or indicating instrument are not shown but can be as described with reference to any of the previous embodiments.

The tubular base member 32 can be attached directly to the specimen under test but in this case is provided with a base plate 40 for effecting this attachment. The operation of this strain gauge is exactly similar to that of the gauges of FIGS. 3 and 4. As in the embodiments of FIGS. 3 and 4 it is possible to make the reference number alone of the same material as the specimen in order to avoid errors due to thermal expansion and contraction.

The strain gauge shown in FIG. 6 comprises a metal tongue or arm 41 which is integral with and extends in a cantilevered manner from a block 42 which is fixed directly to the surface 43 of the specimen under test or to a base plate attachable to the specimen. A single coil 44 is mounted on the specimen surface 43 and a pair of coils 45 and 46 are mounted on the undersurface of the arm 41 opposite the coil 44. The coils in this embodiment differ from the helically-wound coils of previous embodiments in being flat rectangular spiral coils with their axes perpendicular to, instead of parallel with, the direction of movement. The coils 45 and 46 lie in a common plane which is parallel to and spaced from the plane of the coil 44 and the centres of the coils 45 and 46 are sapced apart in the direction of the relative displacement to be measured (indicated by arrows 47 in FIG. 6) with the centre of the coil 44 midway between the centres of the coils 45 and 46 in the null condition. The A.C. source and the indicating or measuring instrument, which are not shown in FIG. 6, can be attached to the terminals of either set of coils as described in relation to previous embodiments and the output to the indicating or measuring instrument is exactly similar to that in the previous embodiments.

When the specimen is placed under stress the coil 44 is displaced from its null position relative to the coils 45 and 46, the latter being held in the same position by the arm 41 which is not subject to stress and thus acts as a reference member. The electrical output is a measure of strain in the specimen.

The tongue 41, which forms a cantilever support, is made of the same material as the specimen so that measurements are unaffected by thermal expansion. The gauge can be enclosed in a sealed waterproof housing similar to that shown in FIGS. 3 and 4 to protect it against corrosive environments.

The single coil 44 has the same number of turns as the coils 45 and 46 and is formed of metal of the same cross-sectional area but each side of each turn of the coil is longer so that the coil takes up a greater area. The coils can be formed of electrically-conductive tape in the manner of a printed circuit.

FIG. 7 shows a length gauge comprising two metal probes 75 and 76 mounted on arms 77 and 78, respectively. Pins 79 and 80 attached to the arm 77 pass through PTFE bushes in the arm 78 and thereby locate the arms relative to one another. Springs 81 and 82 surround the pins 79 and 80, respectively, and press apart the arms 77 and 78. The arm 78 is retained by a roller 83 carried by side members 84 and 85 attached to the arm 77. A handle 86 is attached to the arm 77.

The rod 66 carrying the coils B and C is formed by an extension of the pin 80 while the member 65 is attached to the arm 78. A set displacement of the probes 66 and 67 when they are placed on a calibration standard will give a set output from the coils at the indicating instrument, which can then be arranged to show whether the measured length of a test piece corresponds to this gauge length and to measure small departures from the gauge length.

I claim:

1. A transducer system for detection and/or measurement of relative displacement comprising two relatively-displaceable members, first electrical coil means mounted on one of said members and second electrical coil means mounted on the other of said members, said first electrical coil means comprising a single coil and said second electrical coil means comprising a pair of series-connected coils arranged to interact inductively with the single coil of the first coil means in opposition to one another whereby the inductive interactions are balanced against one another when the single coil is in a symmetrical position relative to the coils of the pair, means for supplying an alternating current to one of said coil means, and means for detecting the currents induced in the other of said coil means, wherein the coils of the first and second coil means are in the form of rectangular spirals having parallel axes, said axes being perpendicular to the direction of relative displacement of the members, the coils of the second coil means lie in a common plane with their centres spaced apart in the direction of relative displacement of said members, the coil of the first coil means lies in a plane parallel to said common plane, each of the coils has the same number of turns, and the length of side of each turn of the single coil of the first coil means is greater than that of the corresponding turn of each coil of the second coil means.

2. A transducer system as claimed in claim 1 constructed as a strain gauge, a first of said members being attached to a part subject to stress at a single location whereby it is not displaced when the stress alters while the second of the said members is attached to the said part at a different location whereby it is displaced relative to the first upon change in stress.

3. A transducer system as claimed in claim 1 wherein a first of said members is a part which is subject to stress and the second of said members is secured to said first member at a first location and extends parallel to said first member in cantilevered manner to support one of said first and second electrical coil means at a second location, whereby said relative displacement occurs upon change of stress applied to said first member.

* * * * *